(12) United States Patent
Date

(10) Patent No.: US 6,294,250 B1
(45) Date of Patent: Sep. 25, 2001

(54) ADHESIVE FILM AND METHOD FOR PRODUCING THE SAME

(75) Inventor: Hidetoshi Abe Date, Tendo (JP)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/242,480

(22) PCT Filed: Aug. 21, 1997

(86) PCT No.: PCT/US97/14752

§ 371 Date: Feb. 17, 1999

§ 102(e) Date: Feb. 17, 1999

(87) PCT Pub. No.: WO98/08909

PCT Pub. Date: Mar. 5, 1998

(30) Foreign Application Priority Data

Aug. 28, 1996 (JP) .................................................... 8-226569

(51) Int. Cl.⁷ .................................. B32B 7/12; B05B 5/10
(52) U.S. Cl. .................... 428/353; 427/207.1; 427/208.8
(58) Field of Search .................................. 428/353, 354; 427/207.1, 208.8

(56) References Cited

U.S. PATENT DOCUMENTS

| | | | | |
|---|---|---|---|---|
| 2,964,422 | * | 12/1960 | Bergstedt et al. | 423/353 |
| 2,986,477 | * | 5/1961 | Eichel | 423/343 |
| 2,988,461 | * | 6/1961 | Eichel | 423/343 |
| 3,149,997 | * | 9/1964 | Tamburro | 423/353 |
| 3,340,088 | * | 9/1967 | Pennisi et al. | 423/353 |
| 3,451,537 | * | 6/1969 | Freeman et al. | 423/353 |
| 4,994,322 | | 2/1991 | Delgado et al. | 428/343 |
| 5,141,790 | | 8/1992 | Calhoun et al. | 428/40 |
| 5,503,927 | * | 4/1996 | Ragland et al. | 423/353 |
| 5,607,763 | | 3/1997 | Matsuda | 428/323 |
| 5,631,079 | * | 5/1997 | Gutman et al. | 423/353 |

FOREIGN PATENT DOCUMENTS

| | | | | |
|---|---|---|---|---|
| 1080247 | * | 4/1960 | (DE) | 428/343 |
| 3-181578 | | 11/1989 | (JP) . | |
| 5-72946 | | 10/1993 | (JP) . | |
| 7-53930 | | 2/1995 | (JP) . | |
| WO 94 22971 | | 10/1994 | (WO) . | |
| WO 94/22971 | | 10/1994 | (WO) | C09J/7/02 |
| WO 96 11116 | | 4/1996 | (WO) . | |
| WO 96/11116 | | 4/1996 | (WO) | B44C/1/10 |
| WO 96/12869 | | 5/1996 | (WO) | E21C/27/24 |
| WO 97/20008 | | 6/1997 | (WO) | C09J/7/02 |
| WO 98/18878 | | 5/1998 | (WO) | C09J/7/02 |
| WO 98/29516 | | 7/1998 | (WO) | C09J/7/02 |
| WO 99/04604 | | 1/1999 | (WO) | H05B/33/14 |

OTHER PUBLICATIONS

WPAT Abstract for Japanese Patent Publication JP–7–53930 (1995) (no month).

* cited by examiner

*Primary Examiner*—Wayne Langel
(74) *Attorney, Agent, or Firm*—John H. Hornickel; Dale A. Bjorkman; Carolyn V. Peters

(57) ABSTRACT

An adhesive film is disclosed which can achieve, at the same time, bubble escapability during adhering, permanent and high peel resistance, and good appearance of the film surface after being adhered. The adhesive film comprises a substrate film, a primer layer formed on said substrate film, and an upper layer which is formed on said primer layer and contains elastic microspheres and a first adhesive polymer, wherein said primer layer comprises a second adhesive polymer and has a compressive modulus of $1 \times 10^6$ to $1 \times 10^7$ dyn/cm², and said elastic microspheres comprises a third adhesive polymer and has a volume average diameter of 10 to 300 µm.

14 Claims, 1 Drawing Sheet

ADHESIVE FILM AND METHOD FOR PRODUCING THE SAME

FIELD OF INVENTION

The present invention relates to an adhesive film such as an decorative adhesive film and a method for producing the same. In particular, the present invention relates to an improvement of an adhesive film comprising an adhesive layer containing elastic microspheres.

BACKGROUND OF INVENTION

When a decorative adhesive film is adhered to an adherent, a volume of an air is trapped between the adhesive layer and adherent, so that the appearance of the decorative film tends to be worsened. To prevent the trapping of air, considerable skill is required to adhere the adhesive film to the adherent, and a relatively large amount of work and a long time are required for adhering.

Various attempts to avoid the trapping of air are disclosed in the following publications, grouped into two approaches as follows.

1) Adhesive film comprising a single layer structure type adhesive layer:

(a) JP-A-6-287525 discloses an adhesive film having a structure in which an adhesive layer comprising elastic microspheres and an adhesive is formed on a surface of a substrate film. Such structure enables the removal of the bubbles between the adhesive and adherent even during contact adhering. The adhesive layer contains the elastic microspheres having a relatively large volume average diameter of 100 to 300 μm and achieves high peel resistance. However, a substrate film surface becomes uneven after the adhesive film is adhered, and it is difficult to maintain good appearance.

(b) A repeelable adhesive film is disclosed in JP-A-8-113768 to have a structure in which an adhesive layer comprising elastic microspheres and an adhesive is formed on a surface of a substrate film. This adhesive layer contains the elastic microspheres having a relatively small volume average diameter of 10 to 100 μm unlike publication (a). Thus, the substrate film surface does not become uneven, and the film has good appearance. However, it is difficult to increase the peel resistance by the use of the elastic microspheres having the relatively small diameter. If elastic microspheres having a further smaller diameter (less than 10 μm) are used to increase an adhesion area and peel resistance, good bubble escapability is not achieved. If an amount of the adhesive in the elastic microsphere layer increases, the bubble escapability is lowered although the peel resistance increases.

(c) JP-A-7-53930 discloses a protective adhesive film having a structure in which an adhesive layer comprising adhesive microspheres is formed on one surface of a substrate film. When this protective film is adhered to an adherent using a laminator, it can be adhered with leaving no bubble at an adhesive interface. However, this publication does not disclose any means for escaping bubbles, high peel resistance and good appearance of the film surface at the same time. Furthermore, this publications does not describe that the adhesive microspheres form clusters.

2) Adhesive film comprising a double layer structure type adhesive layer:

(a) A repeelable adhesive tape or sheet disclosed in JPU-5-72946 is characterized in that it comprises a substrate film, a viscoelastic layer formed on the substrate, and an adhesive layer which contains polymeric microspheres and is formed on said viscoelastic layer. This enables the good adhesion of the tape or sheet to an adherent having an uneven surface such as a corrugated fiberboard, and repealing while preventing spontaneous peeling off. Since the polymeric microspheres having a relatively small average particle size in the range between 1 and 10 μm are used to impart the repeelability to the film, it is difficult to remove the bubbles between the adhesive layer and the adherent. Since the polymeric microspheres comprise a non-adhesive type polymer such as polymethyl methacrylate, an adhesion force Is low, and the film may be spontaneously peeled off when it is used outdoors. Since the viscoelastic layer absorbs the unevenness on the surface when the adhesive film is adhered to the adherent, it should have a flowability such that it can be easily deformed by pressing. However, this Utility Model application does not describe any degree of the viscoelasticity of the layer, (b) A position-adjustable adhesive tape disclosed in JPA-3-181578 has a structure that a plurality of nonadhesive materials or glass beads are distributed with a constant interval on a surface of a pressure sensitive adhesive layer. Since such a structure prevents the direct contact between the adherent and adhesive, the layer has slipping properties, and the good bubble escapability is attained when the film is temporarily adhered. However, after contact adhering, since the beads are embedded in the adhesive, the film is strongly adhered to the adherent but loses the bubble escapability, and it is difficult to remove the bubbles between the adhesive and the adherent during contact adhering.

SUMMARY OF INVENTION

One aspect of the invention is to remove the trapped air ("bubbles") between the adhesive layer and adherent by a simple processing, by placing elastic microspheres in the adhesive layer.

Another aspect of the invention is to provide an adhesive film which can achieve, at the same time, (i) bubble escapability (a property of easily removing bubbles trapped between the adhesive and adherent), (ii) permanent and high peel resistance, and (iii) good appearance of the film surface after being adhered, whereby the above problems of the conventional adhesive films are solved.

The present invention provides an adhesive film comprising a substrate film, a primer layer formed on said substrate film, and an upper layer which is formed on said primer layer and contains elastic microspheres and a first adhesive polymer, wherein said primer layer comprises a second adhesive polymer and has a compressive modulus of $1 \times 10^6$ to $1 \times 10^7$ dyn/cm$^2$, and said elastic microspheres comprises a third adhesive polymer and has a volume average diameter of 10 to 300 μm.

The present invention also provides a method for producing the above adhesive film in which said elastic microspheres form clusters consisting of at least two particles, comprising the steps of: coating a primer layer coating composition comprising a second adhesive polymer on a substrate film and drying it to form a primer layer, and coating a upper layer coating composition comprising 100 wt. parts of a first adhesive polymer and 5 to 500 wt. parts of elastic microspheres on said primer layer and drying it to form an upper layer in which said elastic microspheres form clusters consisting of at least two particles.

Features and advantages of the invention will emerge in the discussion of embodiments.

EMBODIMENTS OF INVENTION

Substrate Film

Figure 1:
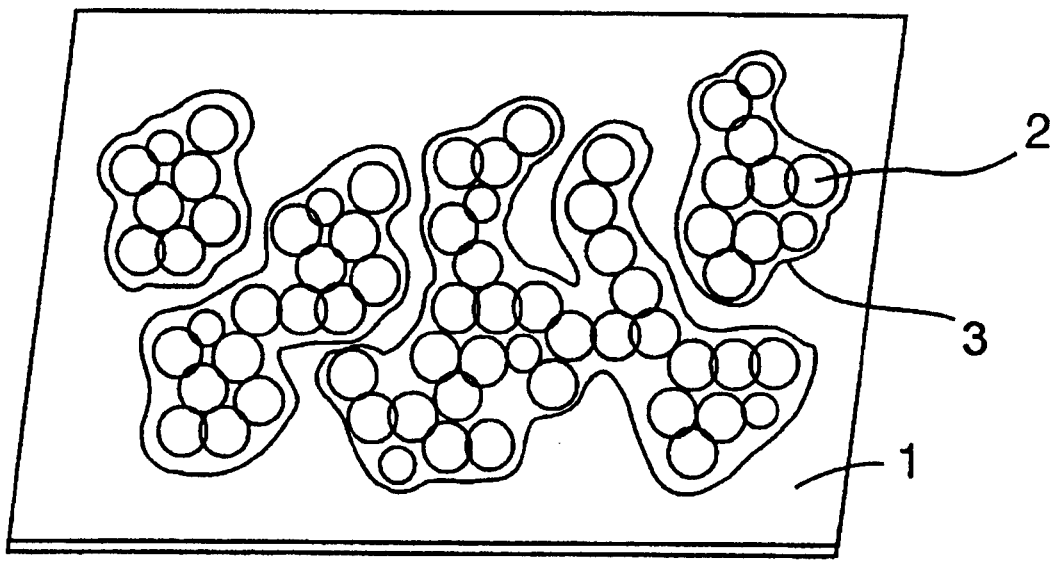
FIG. 1 schematically shows the adhesive film having the clusters of microspheres according to the present invention.

Any conventional adhesive film can be used as the substrate film. For example, a paper sheet, a metal film, a plastic film, etc. can be used. As the plastic, a synthetic polymer such as polyvinyl chloride, polyester, polyurethane, polyacrylate, etc. can be used. The thickness of the film is usually from 10 to 1500 μm.

Primer

The second adhesive polymer used in the primer layer has a compressive modulus in the range between $1 \times 10^6$ and $1 \times 10^7$ dyne/cm$^2$, preferably between $1.5 \times 10^6$ and $5 \times 10^6$ dyne/cm$^2$. When the compressive modulus is less than $1 \times 10^6$ dyne/cm$^2$, the elastic microspheres in the upper layer are embedded in the primer layer, and effective clusters may not be formed. When the compressive modulus exceeds $1 \times 10^7$ dyne/cm$^2$, the primer layer cannot have sufficient plastic deformability, and the permanent peel resistance may not be attained.

Examples of the adhesive polymer are acrylic polymers such as alkyl acrylate-acrylic acid copolymers, copolymers of allry acrylates and other monomers (e.g. other acrylates), natural rubbers, synthetic rubbers, silicone polymers, vinyl acetate polymers, and the like. Among them, the acrylic polymers aide preferred.

The thickness of the primer layer is usually from 10 to 50 μm, preferably from 15 to 40 μm. When this thickness is smaller than 10 μm, high peel resistance may not be attained. When this thickness exceeds 50 μm, the elastic microspheres in the upper layer are embedded in the primer layer, and no effective clusters may be formed.

The primer layer can be formed by dissolving or dispersing the above adhesive polymer in a suitable solvent (e.g. water, ethyl acetate, heptane, toluene, methanol, methyl ethyl ketone, etc.) together with conventionally used additives (erg. a crosslinking agent, a pigment, a UV absorber, a tackifier, an antifoaming agent, a leveling agent, etc.), coating the mixture on the surface of the substrate film by a conventional method and an apparatus (e.g. a knife coater, a roll coater, a die coater, a bar coater, etc.), drying the coated mixture usually at a temperature of 60 to 180° C. for 1 to 10 minutes.

As the first adhesive polymer used in the upper layer, a polymer which exhibits adhesion at room temperature and can be used as a pressure sensitive adhesive is used. As such a polymer, polyacrylate, polyurethane, polyolefin, polyester, and the like can be used. Among them, a water-dispersible polymer is preferred. As in the case of conventional pressure sensitive adhesives, a tackifier may be used in combination with the adhesive polymer.

A viscosity of the upper layer coating composition is usually from 100 to 6000 cps, preferably from 200 to 3000 cps. When the viscosity is less than 100 cps, the upper layer having a sufficient coating weight may not be formed. When the viscosity exceeds 6000 cps, clusters having a sufficient size may not be formed.

A coating weight of the upper layer is usually from 4 to 40 g/m$^2$, preferably from 10 to 30 g/m$^2$. When the coating weight is less than 4 g/m$^2$, sufficient peel resistance may not be achieved. When the coating weight exceeds 40 g/m$^2$, the elastic microspheres may not form clusters, which will be explained in detail.

A coating composition for the upper layer can be prepared by mixing the elastic microspheres, adhesive polymer, solvent and optional additives in a mixing apparatus such as a homomixer, a planetary mixer, etc. to obtain an adhesive coating composition in which the components are homogeneously dispersed. The prepared coating composition is coated on the already formed primer layer and dried to form the upper layer.

As coating means, conventional means such as a knife coater, a roll coater, a die coater, a bar coater, etc. can be used. The coated composition is dried at a temperature of 60 to 180° C. A drying time is from several ten seconds to several minutes.

As the solvent, water or an organic solvent may be used. For the formation of the effective clusters, an aqueous coating composition is suitable. In this case, the drying temperature is usually 100° C. or higher. In addition, a co-solvent which is partly miscible with water may be added. Examples of useful co-solvents are alkylene glycol monoalkyl ether esters such as 3-methyl-3-methoxybutyl acetate.

As the additive, any conventionally used additive may be used as long as the effects of the present invention are not impaired. Examples of the additives are a crosslinking agent, a viscosity modifier, an anti-foaming agent, a leveling agent, a UV light absorber, an antioxidant, a pigment, etc.

After the formation of the upper layer, it may be coated with a silicone-treated liner for the protection of the upper layer.

Elastic Microspheres

The term "elastic microsphere", or "microsphere" means a material at least a surface of which has tackiness, and exhibits rubbery elasticity as a whole. The rubbery elasticity of the microspheres is necessary for the formation of passageways which prevent disappearance of bubble escaping passages due to the plastic deformation of the microspheres caused by the pressure. In addition, the microspheres themselves make it easy and sure to form the cluster structure, and improve the adhesion force of the adhesive layer to the uneven surface.

In the present invention, the volume average diameter of the microspheres is usually from 10 to 300 μm, preferably from 30 to 200 μm.

In general, to improve the peel resistance of the adhesive film, a large size of the microsphere (for example, a volume average diameter of 100 μm or larger), and addition of a large amount of the adhesive polymer to the upper layer which contains the microspheres (for example, at least 100 wt. parts per 100 wt. parts of the microspheres) are effective. However, when the single layer upper layer is used, the large microspheres will cause the apparent unevenness on the adhesive film which is adhered to the adherent, and deteriorate the appearance of the adhered film. The larger amount of the adhesive polymer in the upper layer will deteriorate the bubble escapability.

When the upper layer containing the microspheres having a relatively large volume average diameter (for example, 100 to 300 μm) is formed over the primer layer having the above compressive modulus, the primer layer absorbs the unevenness formed by the microspheres, and prevents the deterioration of the appearance of the film surface when the adhesive film is adhered to the adherent.

Since the primer layer contains the adhesive polymer, it increases the peel resistance, when the upper layer contains the microspheres having the relatively small volume average diameter. (for example, 10 to 100 μm). In such a case, the tackiness of the microspheres, that is, the inclusion of the adhesive polymer in the microspheres will realize the permanent and high peel resistance (for example, an adhesion force of at least about 1 kgf/25 mm). A volume average diameter of 10 to 300 μm of the elastic microspheres is suitable for improving the bubble escapability.

The volume average diameter is obtained by measuring diameters of 1000 microspheres using an optical microscope and an image analyzer, and calculating an average value according to the following equation (1):

$$\text{Volume average diameter } (\mu m) = \Sigma(d_i^4 \times n_i)/\Sigma(d_i^3 \times n_i) \quad (1)$$

wherein $d_i$ is a diameter ($\mu$m) of a microsphere having an i-th largest diameter, and $n_i$ is the number of microspheres having the diameter $d_i$.

The microsphere may be a solid one or a hollow one having at least one void therein. As a material of the microspheres, polyacrylate (acrylic copolymer) is preferred, since its rubbery elasticity and tackiness are easily controlled.

The compressive modulus of the microspheres is preferably in the range between $1 \times 10^5$ and $1 \times 10^7$ dyne/cm$^2$.

The compressive modulus is measured using a RSA II viscoelastic spectrometer (manufactured by RHEOMETRIX) at 20° C. That is, the temperature dependency of the modulus is measured by changing a temperature from −80° C. to 150° C. with applying a compression strain having a frequency of 1 rad/sec., and a measured value at 20° C. is used as the compressive modulus.

Method for Producing Elastic Microspheres

The microspheres may be produced by any of known methods such as suspension polymerization, emulsion polymerization, seed polymerization, and the like. As an example, a method for producing the microspheres of polyacrylate by emulsion polymerization will be explained briefly.

In a reactor equipped with a mechanical stirrer, deionized water, an acrylic monomer, a radical polymerization initiator, and other optional additives are added, and the interior of the reactor is purged with an inert gas. Then, the reactor is heated to a specific temperature to initiate polymerization of the monomer while stirring.

In general, the stirring rate is from 10 to 700 rpm, and the reaction temperature is from 30 to 120° C. The reaction time is usually from several hours to several ten hours.

As the acrylic monomer, a mixture of an alkyl acrylate (e.g. isooctyl acrylate, 2-ethylhexyl acrylate, isononyl acrylate, etc.) and an acrylic unsaturated acid (e.g. acrylic acid, methacrylic acid, itaconic acid, maleic acid, etc.) is used. A weight ratio of the alkyl acrylate to the acrylic unsaturated acid is preferably from 99:1 to 90:10. When the amount of the alkyl acrylate is too small, the tackiness is lowered, while it is too large, the rubbery elasticity decreases. In either case, the adhesion force to the uneven surface tends to decrease. It is possible to crosslink the polyacrylate by the addition of a crosslinking agent comprising a bifunctional acrylate such as divinyl benzene 1,4-dibutyl-2-diacrylate to the above mixture.

The production method of the polyacrylate microspheres is disclosed in, for example, U.S. Pat. No. 4,994,322.

The produced microspheres are recovered by filtration and used in general, while the as-produced aqueous dispersion containing the microspheres after the reaction can be used, and the tacky polymer is added to the dispersion to obtain the adhesive coating composition.

Cluster of Elastic Microspheres

"Cluster of elastic microspheres" means the agglomerate of the elastic microspheres which are dispersed in a bulk form of two or more of the microspheres in the matrix of the tacky polymer to form a convex part (convex adhesive part) having an irregular shape and irregular configuration.

That is, the adhesive layer comprises "island" parts (discrete phases) comprising the cluster(s) and the tacky polymer, and relatively flat "sea" parts (continuous parts) comprising the tacky polymer but no cluster.

The adhesive film having such clusters is schematically shown in FIG. 1. The adhesive film 1 has the discrete adhesive parts 3 containing the clusters of the microspheres 2.

Such a cluster 2 comprises an agglomerate of the elastic microspheres which are arranged in a two-dimensional plane, an agglomerate of the elastic microspheres which are three dimensionally arranged, or both. When the adhesive film is adhered to the adherent, the agglomerated elastic microspheres in the cluster are shifted to deform the convex adhesive part in a shape which is suitable to be adhered to the uneven surface of the adherent. However, the degree of this deformation should be in an extent that passageways which communicate with the atmosphere are formed and maintained between the uneven surface and the upper layer. The degree of the deformation can be controlled by the tackiness of the elastic microspheres, and the inclusion of the elastic microspheres and the tacky polymer in a specific ratio.

A mixing amount of the elastic microspheres is preferably from 5 to 500 wt. parts, more preferably from 20 to 400 wt. Parts, per 100 wt. parts of the adhesive polymer. When the amount of the elastic microspheres is less than 5 wt. parts, it is difficult to form the clusters having effective sizes. When the amount of the elastic microspheres exceeds 5 wt. parts, the adhesion force tends to decrease.

According to the present invention, the primer layer can increase the peel strength, even when the amount of the adhesive polymer in the upper layer is relatively small, for example, less than 100 wt. parts per 100 wt. parts of the elastic microspheres. In this case, the formation of the clusters consisting of two or more elastic microspheres is further effective for improving the bubble escapability. In addition, the control of the compressive modulus or the thickness of the primer layer is effective on the improvement of the bubble escapability.

The clusters of the elastic microspheres in the upper layer can be easily formed by the above coating method. In this case, the clusters of the elastic microspheres are more easily formed, when the first adhesive polymer in the upper layer is a water dispersible polymer and the upper layer coating composition comprising the water dispersible polymer is coated on the primer layer which has been dried and comprises the second adhesive polymer.

Further embodiments are described in the following examples.

EXAMPLES

Examples 1–6 and Comparative Examples 1–7

(1) Materials Used

Substrate Film

A 70 $\mu$m thick polyvinyl chloride film having a 50 $\mu$m thick polyester carrier.

Tacky Polymer in the Primer and Upper Layers

An aqueous dispersion tackifier E-1000 manufactured by SOKEN CHEMICAL Co., Ltd. A monomer composition: butyl acrylate acrylic acid=94:4 (weight ratio). Compressive modulus, $3.5 \times 106$ dyn/cm$^2$.

Elastic Microspheres

Examples 1–6 and Comparative Examples 1–3

Elastic microspheres of Sumitomo-3M (produced by the suspension polymerization in water as a medium) having the volume average diameter of 40 μm (Elastic microsphere A) or 38 μm (Elastic microsphere B) were used. The former was solid spheres, while the latter was hollow spheres. A monomer composition: isooctyl acrylate:acrylic acid 96:4 (by weight). Compressive modulus:2.5×106 dyne/cm$^2$.

(Comparative Example 4)

Elastic microspheres of Sumitomo-3M (produced by the suspension polymerization in water as a medium) having the volume average diameter of 135 μm (Elastic microsphere C). A monomer composition: isooctyl acrylate:acrylic acid= 96:4 (by weight).

Compressive modulus: 2.2×106 dyn/cm$^2$.

(Comparative Example 6)

Glass beads (5620-3635 manufactured by 3M; solid spheres having the volume average diameter of 56 μm; compressive modulus: ×1011 dyn/cm2) was used in place of the elastic microspheres.

(Comparative Example 7)

Acrylic beads (MBX-70 manufactured by SEKISUI KASEIHIN KABUSHIKIKASHA; non-tacky solid spheres having the volume average diameter of 74 μm; compressive modulus: 2×1010 dyn/cM2) was used in place of the elastic microspheres.

(Comparative Example 5)

A SCOTCHCAL Film 3650 of 3M which is connmercially sold as a marking film was used.

(2) Formation of a Primary Layer

The aqueous dispersion tackifier (E-1000) for the primer layer was coated on one surface of the substrate film with a knife coater so as to achieve a dry thickness shown in Table 1, followed by drying at 105° C. for 5 minutes to form the primer layer.

(3) Formation of an Upper Layer

Using a homomixer, the elastic microspheres A or B were mixed with the aqueous dispersion tackifier E-1000 in an amount shown in Table 1 per 100 wt. parts of the adhesive polymer in the aqueous dispersion tackifier. The mixture was coated on the formed primer layer with a knife coater so as to achieve a coating weight shown in Table 1, followed by drying at 105° C. for 5 minutes to form the upper layer.

On the upper layer, a silicone liner (PK 530 BH manufactured by TOKUSHU SEISHI) was laminated, and then the polyester carrier was removed from the substrate film to obtain an adhesive film.

Properties of the Adhesive Films

With each of the adhesive films, the contact area rate, bubble escapability, presence of unevenness on the film and the adhesion force were measured or evaluated using the following procedures.

Contact Area Rate

On a flat surface of a slide glass of 76 mm in length, 26 mm in width and 1 mm in thickness (MICRO SLIDE GLASS HAKUROKUMA No. 1 manufactured by MATSU-NAMI GLASS INDUSTRIES, Co., Ltd.), the adhesive layer (upper layer) of the adhesive film of about 5 cm×about 2 cm, from which the liner had been removed, was adhered and pressed by reciprocating a roller of 2 kg In weight and about 4.5 cm in width over the film three times with a linear pressure of 1 kg/cm to obtain a sample.

When the glass plate was illuminated by a white light from the glass surface on which the adhesive film was not adhered, and the reflected light was observed through a polarized light filter, domains in which the convex adhesive parts and the glass surface were contacted were seen dark, while non-contact domains were seen white. The image was observed with an optical microscope (EMP-ST manufactured by KYOWA KOGAKU) and imputed in a image analyzer (EXCEL-11 manufactured by NIPPON AVIONICS) through a CCD camera (TO-32×A manufactured by NEC), and a ratio of the total area of the contact domains to the area of the whole observed field was expressed in "percentages", which was used as the "contact area rate". Here, the area of the whole observed field was about 1 cm$^2$.

Bubble Escapability

After peeling off the liner, the adhesive film of 10 cm×10 cm was placed on a flat acrylate plate, and squeezed by a squeezer towards the center of the adhesive film to gather bubbles. A roller of 2 kg was rolled over the bubbles several times, and a degree of the bubble escape was observed. When all the bubbles escaped, the film was ranked "OK", while when a part of bubbles remained, the film was ranked "NG".

Presence of Unevenness on the Film Surface

A sample of the adhesive film of 30 cm×30 cm was adhered to an acrylic plate, and unevenness on the film surface was observed. When the shape of the elastic microsphere was observed, the adhesive film was ranked "NG", while the film which had no problem in practical use was ranked "OK".

Adhesion Force

An adhesive film of 15 cm×2.5 cm was adhered to a melamine baked coated plate (manufactured by Nippon Test Panel) which had been decreased with isopropanol at 20° C., 65% RH (Ra of the rough surface being in the range between 20 and 100 μm) according to Japanese Industrial Standard JIS Z 0237, and kept at the same temperature and the same humidity for 48 hours. Then, a 180 degree peel strength was measured at a peeling rate of 30 cm/min.

The results are shown in Table 1.

TABLE 1

| Ex. No. | Thickness of primer layer (μm) | Microspheres Kind | Microspheres Volume av. diameter (μm) | Microspheres Weight parts 1) | Coating weight of upper layer (g/m$^2$) | Contact area rate (%) | Bubble escapability | Unevenness on film surface | Adhesion force (kgf/25 mm) |
|---|---|---|---|---|---|---|---|---|---|
| E. 1 | 37 | A | 40 | 100 | 19 | 57 | OK | OK | 1.3 |
| E. 2 | 28 | B | 38 | 100 | 11 | 67 | OK | OK | 1.1 |
| E. 3 | 15 | A | 40 | 35 | 13 | 36 | OK | OK | 1.0 |

TABLE 1-continued

| Ex. No. | Thickness of primer layer (μm) | Microspheres Kind | Microspheres Volume av. diameter (μm) | Microspheres Weight parts 1) | Coating weight of upper layer (g/m²) | Contact area rate (%) | Bubble escap- ability | Uneven- ness on film surface | Adhesion force (kgf/25 mm) |
|---|---|---|---|---|---|---|---|---|---|
| E. 4 | 28 | A | 40 | 35 | 11 | 53 | OK | OK | 1.3 |
| E. 5 | 30 | A | 40 | 100 | 10 | 41 | OK | OK | 1.1 |
| E. 6 | 30 | A | 40 | 400 | 6 | 41 | OK | OK | 1.0 |
| C. 1 | — | A | 40 | 409 | 15 | 58 | OK | OK | 0.5 |
| C. 2 | — | B | 38 | 100 | 10 | 48 | OK | OK | 0.4 |
| C. 3 | — | A | 40 | 35 | 29 | 75 | NG | OK | 1.0 |
| C. 4 | — | C | 135 | 100 | 67 | 67 | OK | NG | 1.0 |
| C. 5 | 30 | — | — | — | — | 100 | NG | OK | 1.7 |
| C. 6 | 28 | 2) | 56 | 35 | 26 | — | — | — | 0.1 |
| C. 7 | 28 | 3) | 74 | 35 | 27 | — | — | — | 0 |

Notes:
1) Per 100 wt. parts of the adhesive polymer.
2) Glass bead.
3) Acrylic beads.

Since the samples of Comparative Examples 1 and 2 had no primer layer, their adhesion force was 0.5 kgf/25 mm or less, while the samples of Examples 1–6 had the adhesion force of 1 kgf/25 mm or larger, which was at least twice that of Comparative Examples 1 and 2 becase of the presence of the primer layer.

Although the samples of Comparative Examples 3 and 5 had the adhesion force of 1 kgf/25 mm or larger, they had no bubble escapability. In contrast, the samples of Examples 1–6 had the adhesion force of 1 kgf/25 mm or larger, and good bubble escapability.

Although the sample of Comparative Example 4 had the adhesion force of 1.0 kg/25 mm and good bubble escapability, it formed unevenness on its qurface so that the appearance was deteriorated when it was adhered to the adherent. Then, it cannot be used practically. In contrast, the samples of Examples 1–6 had the adhesion force of 1 kgf/25 mm or larger, good bubble escapability, and good film appearance.

Since the microspheres used in the samples of Comparative Examples 6 and 7 had too large compressive modulus, they could not be adhered to the adherent, while the samples of Examples 1–6 had the sufficient adhesion force.

The invention is not limited to the above embodiments. The claims follow.

What is claimed is:

1. An adhesive film comprising:
   a substrate film;
   a primer layer formed on said substrate film wherein said primer layer has a thickness of 10–50 μm and said primer layer comprises a second adhesive polymer and said primer layer has a compressive modulus of $1 \times 10^6$ to $1 \times 10^7$ dyne/cm²; and
   an upper layer which is formed on said primer layer and contains tacky elastic microspheres and a first adhesive polymer,
   wherein said tacky elastic microspheres comprise a third adhesive polymer and have a volume average diameter of 10 to 300 μm,
   said tacky elastic microspheres forming convex shapes on said primer layer that allow air to escape between the adhesive film and an adherent.

2. The adhesive film of claim 1, wherein the coating weight of the upper layer is between 4–40 g/m².

3. The adhesive film of claim 1, wherein the coating weight of the upper layer is between 10–30 g/m².

4. The adhesive film of claim 1, wherein the tacky elastic microspheres have a volume average diameter of 30 to 200 μm.

5. The adhesive film of claim 1, wherein the upper layer coating composition comprises 100 wt. parts of a first adhesive polymer and 20 to 400 wt. parts of tacky elastic microspheres.

6. The adhesive film of claim 1, wherein the primer layer has a compressive modulus of $1.5 \times 10^6$ to $5 \times 10^6$ dyne/cm².

7. The adhesive film of claim 1 wherein said second adhesive polymer is an acrylic polymer, and said first adhesive polymer is a water-dispersible polymer.

8. A method for producing an adhesive film claimed in claim 1, comprising the steps of:
   a) coating a primer layer coating composition comprising a second adhesive polymer on a substrate film and drying it to form a primer layer, wherein said primer layer has a thickness of 10–50 μm, said primer layer comprises a second adhesive polymer and said primer layer has a compressive modulus of $1 \times 10^6$ to $1 \times 10^7$ dyne/cm²; and
   b) coating a upper layer coating composition comprising 100 wt. parts of a first adhesive polymer and 5 to 500 wt. parts of tacky elastic microspheres on said primer layer and drying it to form convex shapes on said primer layer that allow air to escape between the adhesive film and an adherent; wherein said tacky elastic microspheres comprise a third adhesive polymer and have a volume average diameter of 10 to 300 μm.

9. The method according to claim 8, wherein said second adhesive polymer is an acrylic polymer, and said first adhesive polymer is a water-dispersible polymer.

10. The method according to claim 8, wherein the coating weight of the upper layer is between 4–40 g/m².

11. The method according to claim 8, wherein the coating weight of the upper layer is between 10–30 g/m².

12. The method according to claim 8, wherein the tacky elastic microspheres have a volume average diameter of 30 to 200 μm.

13. The method according to claim 8, wherein the upper layer coating composition comprises 100 wt. parts of a first adhesive polymer and 20 to 400 wt. parts of tacky elastic microspheres.

14. The method according to claim 8, wherein the primer layer has a compressive modulus of $1.5 \times 10^6$ to $5 \times 10^6$ dyne/cm².

* * * * *

UNITED STATES PATENT AND TRADEMARK OFFICE
CERTIFICATE OF CORRECTION

PATENT NO. : 6,294,250 B1
DATED : September 25, 2001
INVENTOR(S) : Abe, Hidetoshi It is certified that error appears in the above-identified patent and that said Letters Patent is hereby corrected as shown below:

Column 1,
Line 7, delete "an" and insert therefore -- a --.
Line 59, delete "publications" and insert therefore -- publication --.

Column 2,
Line 9, delete "Is" and insert therefore -- is --.
Line 57, delete "a" and insert therefore -- an --.

Column 3,
Line 17, delete "dynelcm$^2$" and insert therefore -- dyne/cm$^2$ --.
Line 22, delete "allry" and insert therefore -- alkyl --.
Line 25, delete "aide" and insert therefore -- are --.
Line 36, delete "erg." and insert therefore -- e.g. --.

Column 6,
Line 24, delete "Parts" and insert therefore -- parts --.
Line 27, delete "5" and insert therefore -- 500 --.
Line 62, delete "dyn/cm$^2$" and insert -- dyne/cm$^2$ --.

Column 7,
Lines 14, 19 and 27, delete "dyn/cm$^2$" and insert -- dyne/cm$^2$ --.

Column 8,
Line 12, delete "In" and insert therefore -- in --.
Line 21, delete "a" and insert therefore -- an --.

Column 9,
Table 1, Ex. No. C. 1, delete "409" and insert therefore -- 400 --.
Line 26, delete "because" and insert therefore -- because --.
Line 35, delete "qurface" and insert therefore -- surface --.

UNITED STATES PATENT AND TRADEMARK OFFICE
CERTIFICATE OF CORRECTION

PATENT NO. : 6,294,250 B1
DATED : September 25, 2001
INVENTOR(S) : Abe, Hidetoshi It is certified that error appears in the above-identified patent and that said Letters Patent is hereby corrected as shown below:

<u>Column 10,</u>
Line 41, delete "a" and insert therefore -- an --.

Signed and Sealed this

Twenty-fourth Day of December, 2002

JAMES E. ROGAN
*Director of the United States Patent and Trademark Office*